(12) United States Patent
Forrester et al.

(10) Patent No.: US 8,033,705 B2
(45) Date of Patent: Oct. 11, 2011

(54) BACKLIGHT ASSEMBLY WITH THIN FILM LIGHT PIPE

(75) Inventors: Thomas Forrester, Hacienda Heights, CA (US); Engin Arik, Thousand Oaks, CA (US); Evgeni Poliakov, San Pedro, CA (US)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 12/634,910

(22) Filed: Dec. 10, 2009

(65) Prior Publication Data
US 2010/0149832 A1 Jun. 17, 2010

Related U.S. Application Data

(62) Division of application No. 11/866,251, filed on Oct. 2, 2007, now Pat. No. 7,926,995.

(51) Int. Cl.
*F21V 11/00* (2006.01)

(52) U.S. Cl. ......... 362/558; 362/551; 362/555; 359/599

(58) Field of Classification Search ............... 362/558, 362/551, 555, 97.1; 359/599
See application file for complete search history.

(56) References Cited

U.S. PATENT DOCUMENTS

| | | | |
|---|---|---|---|
| 5,064,266 A | 11/1991 | Sun et al. | |
| 5,459,645 A | 10/1995 | Sattler et al. | |
| 6,256,447 B1 * | 7/2001 | Laine | 385/146 |
| 6,290,368 B1 * | 9/2001 | Lehrer | 362/187 |
| 6,481,882 B1 | 11/2002 | Pojar | |
| 6,646,813 B2 | 11/2003 | Falicoff et al. | |
| 7,195,386 B2 * | 3/2007 | Imade | 362/551 |
| 7,286,296 B2 | 10/2007 | Chaves et al. | |
| 2005/0051466 A1 | 3/2005 | Carter et al. | |
| 2006/0092532 A1 | 5/2006 | Ouderkirk et al. | |
| 2006/0152931 A1 | 7/2006 | Holman | |

* cited by examiner

*Primary Examiner* — Ali Alavi
(74) *Attorney, Agent, or Firm* — Morgan Lewis & Bockius LLP

(57) ABSTRACT

A backlight assembly is provided. The backlight assembly includes a light pipe assembly having a thickness of about 90 microns, a light source and a coupler that receives light from the light source and diffuses the received light from the light source into the first end of the light pipe assembly.

4 Claims, 7 Drawing Sheets

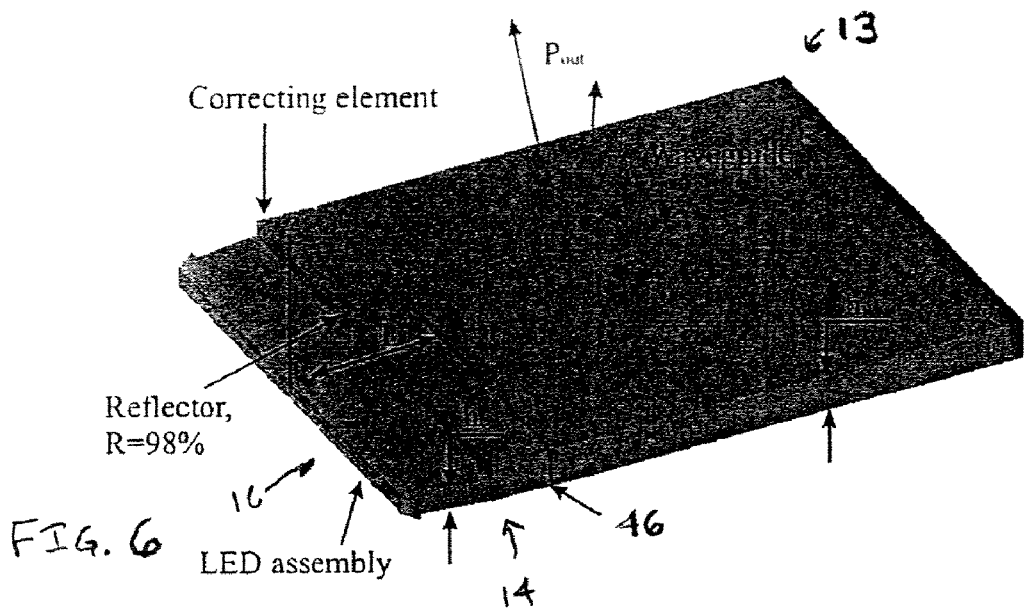
FIG. 6
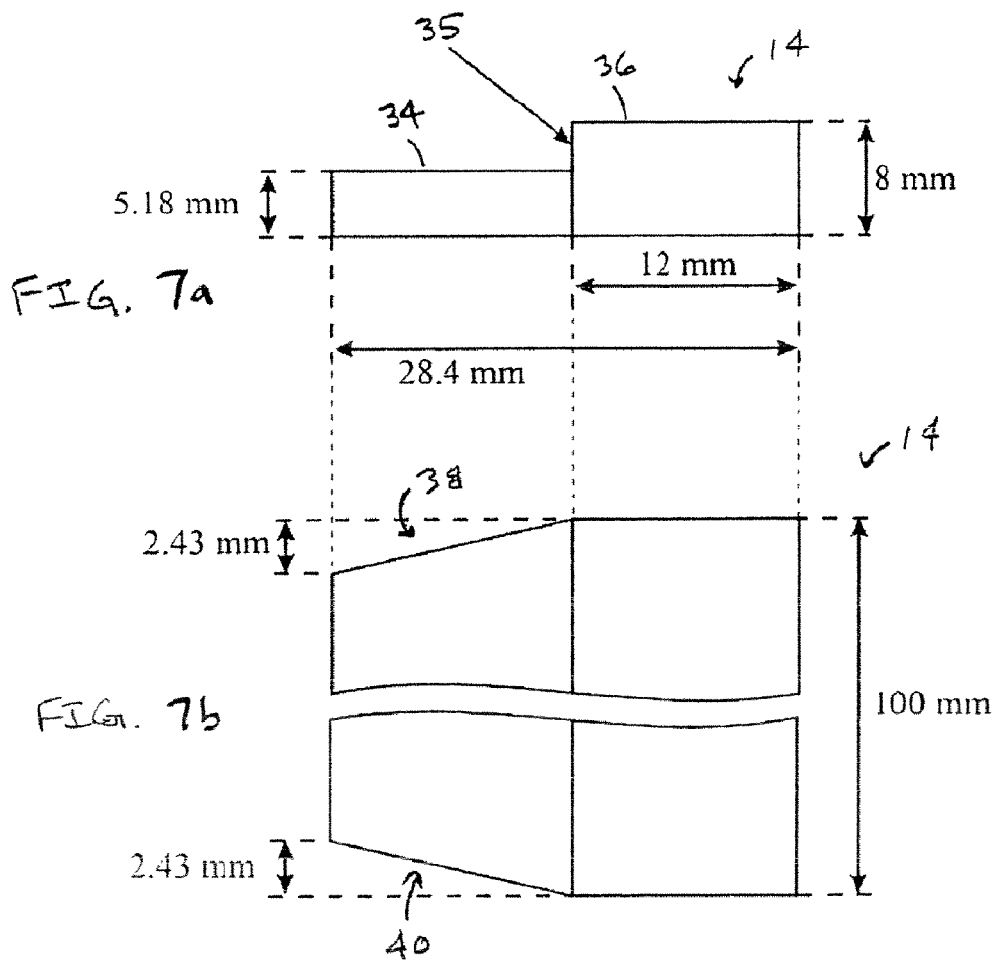
FIG. 7a
FIG. 7b

BACKLIGHT ASSEMBLY WITH THIN FILM LIGHT PIPE

This is a divisional application of application Ser. No. 11/866,251 now U.S. Pat. No. 7,926,995, filed on Oct. 2, 2007, which is hereby incorporated by reference.

FIELD OF THE INVENTION

The present invention is directed generally to backlight assemblies and, more particularly, to backlight assemblies for liquid crystal displays for computers and the like.

BACKGROUND OF THE INVENTION

Many portable devices such as portable computers use backlight assemblies for illuminating displays such as liquid crystal displays. Backlight assemblies typically include a light pipe that couples light from a light source such as one or more LEDs into the display using a process called total internal reflection (TIR).

When light within a light pipe impinges on a front or rear surface of the light pipe at the proper angle, the light exits the light pipe and passes through one or more layers of additional light diffusing, directing or turning films before entering and illuminating the display.

In order to improve brightness, a number of prior art techniques have been used. For example, since the display to be illuminated is adjacent a front of the light pipe, the back of the light pipe is typically coated with a reflective material. Another technique is to limited egress of light out of the front surface of the light pipe to only that light that is substantially normal to the front surface of the light pipe.

One method to accomplish this objective has been to leave a small air gap between the light pipe and any covering film. The air gap provides a significant change in the index of refraction that causes light at low angles to be reflected back into the light pipe.

While prior art methods have proven to be somewhat effective, significant improvements can still be made. Accordingly, a need exists for better methods of coupling light into back light assemblies.

SUMMARY

A backlight assembly is provided. The backlight assembly includes a light pipe assembly having a thickness of about 90 microns, a light source and a coupler that receives light from the light source and diffuses the received light from the light source into the first end of the light pipe assembly.

In another aspect the backlight system includes a corrective lens.

In another aspect the backlight system includes a concave surface between the corrective lens and light source.

In another aspect the backlight system includes an air gap between the coupling lens and light source.

In another aspect the backlight system includes a variable distance beginning with a relatively small distance at a periphery of the concave lens and a maximum air gap proximate a center of the concave lens.

In another aspect the backlight system includes a concave surface between the corrective lens and light pipe assembly.

In another aspect the backlight system includes an air gap between the coupling lens and light source.

In another aspect the backlight system includes a variable distance beginning with a relatively small distance at a periphery of the concave lens and a maximum air gap proximate a center of the concave lens.

In another aspect the backlight system includes a planar top and bottom surfaces with parallel microgrooves disposed perpendicular to an axis of transmission of the light source.

In another aspect the backlight system includes a stepped structure perpendicular to an axis of transmission of the light source with a first portion that engages the light pipe of a thickness substantially equal to a thickness of the light pipe assembly and a second portion that engages the light source stepped down to a smaller relative thickness than the first portion.

In another aspect the backlight system the step further includes a reflector.

In another aspect the backlight system includes a light pipe assembly, a light source and a coupler with a lens disposed between the light source and light pipe assembly that diffuses light from the light source into the light pipe assembly.

In another aspect the backlight system includes a light pipe assembly, a light source and a coupler with a light receiving portion dimensioned for an angular emission characteristic of the light source.

In another aspect the backlight system includes a light pipe assembly, an LED array and a coupler with a light receiving portion dimensioned to compensate for insufficient LED assembly length.

In general terms, the thin film light pipe of the present invention comprises an input prismatic structure, an integral V-groove bottom surface and an integral holographic diffuser upper surface. The total thickness of the light pipe configuration is intended to be about 90 microns.

The backlighting assembly uses alternative couplers to direct light from one or more light emitting diodes into a light pipe. The coupler efficiently collects light from LEDs having a relatively large optical aperture and propagates most of the available light into a thinner (90 micron) entrance. The light pipe uses total internal reflection and a bottom reflector to re-direct most of the entering light towards an upper exit surface through an integral embossed diffuser referred to below as the lower diffuser. The diffused light then passes through a pair of crossed prisms (lower and upper prism) and yet another diffuser (i.e., the upper diffuser).

In other aspects, the thin film light pipe back light assembly of the present invention may be characterized as follows. A back light system, commonly recognized as side edge type backlight system, having a light input end on a side surface of the light pipe and in the direction of the thickness of light pipe, consisting of light pipe, having a thickness of about 90 microns.

The thin film back light system may also be characterized as having an integral element on one surface of said light pipe that directs light to exit towards a display system which is placed in close proximity of said back light system. Light injection from one side of said light entrance made in the direction of decreasing thickness of said light pipe, the opposing surface of said integral element of said light pipe having integral diffuser element directing light. Further, such integral diffusing element has a stronger diffusing power in the direction transverse to the direction of propagation of light from the light source and a smaller diffusing power in the direction of propagation of light.

The thin film back light system may also include a light pipe having layers of element structure directing light to an exit and a layer of transparent film material with a diffuser pattern that is formed by heat embossing the surface of said transparent film material.

The thin film back light system may have a light pipe manufactured by a UV replication process of the desired structure on a transparent film by a molding process or drum by illuminating light while pressing said transparent film against the mold or drum, the film being prepared by coating UV curing resin on the surface of said transparent film material. UV resin having a close proximity refractive index with said transparent film material, the film material having an element structure directing light to exit from said light pipe and a diffuser structure that is integral to said light pipe.

The thin film back light system may also have a light pipe with an integral surface relief holographic pattern with light shaping function to direct light in desired directions.

The thin film back light system may also have an integral diffuser pattern that may be continuous or non-continuous, a pseudo prismatic element or linear groove structure, its groove structure running parallel to the direction of light propagating through said light pipe. This means the light entering the light pipe propagates to the far end of the light pipe, which is opposite the side entrance, or light input end of the light pipe.

The thin film back light system may have an element to direct light to exit from the light pipe, the element being micro lens arrays or cross mesh structure of desired shape arranged to be either parallel to the light entrance of said light pipe plane or quasi parallel to the direction of light propagation.

BRIEF DESCRIPTION OF THE DRAWINGS

FIG. 6 depicts the coupler and a portion of the waveguide of FIG. 5 with additional details;

FIG. 7a-b depict side and top view of the coupler of FIG. 6;

DETAILED DESCRIPTION OF AN ILLUSTRATED EMBODIMENT OF THE INVENTION

Back light assemblies for LCD are typically illuminated through the use of LEDs. However, the vast majority of LED sources have large divergence angular emittance patterns (typically, a 60° half width full maximum (HWFM)), which makes difficult to capture and use all of the light radiated by LEDs to provide high efficiency for the optical system, which uses the LEDs. Typical optical couplers based on lenses result in efficiencies of 65-70% while non-imaging couplers, which utilize microgroove complex geometry can (in principle) reach 99% efficiency. However, state-of-the-art optical designs proposed in illustrated embodiments of the current invention result in compact efficient designs of lens-waveguide couplers, with uniformity of nearly 100% across radiation plane and up to 85% optical efficiency. The couplers can be made extremely small and have dimensions on the mm scale, and can be made by means of plastic polishing, injection molding, or embossing processes. The waveguide, being a part of the optics couplers, proposed here has an apex angle of 110 degree and 50-100 micron variable pitch. It can be also made by means of fast replication using a drum, or embossing process.

The present invention, as shown in the figures comprises what could summarily be described as a highly efficient optical coupler-waveguide for edge-lit backlights. The coupling devices described below provide a uniform and homogeneous light distribution within the assembly cross-section and launches light effectively from a high divergence source to the tapered waveguide and eventually, to the edge-lit assembly. The couplers are non-imaging and are used for collecting the light from a single, or array of diverging sources and re-directing it to the backlight lightpipe with high efficiency.

Figure 1:
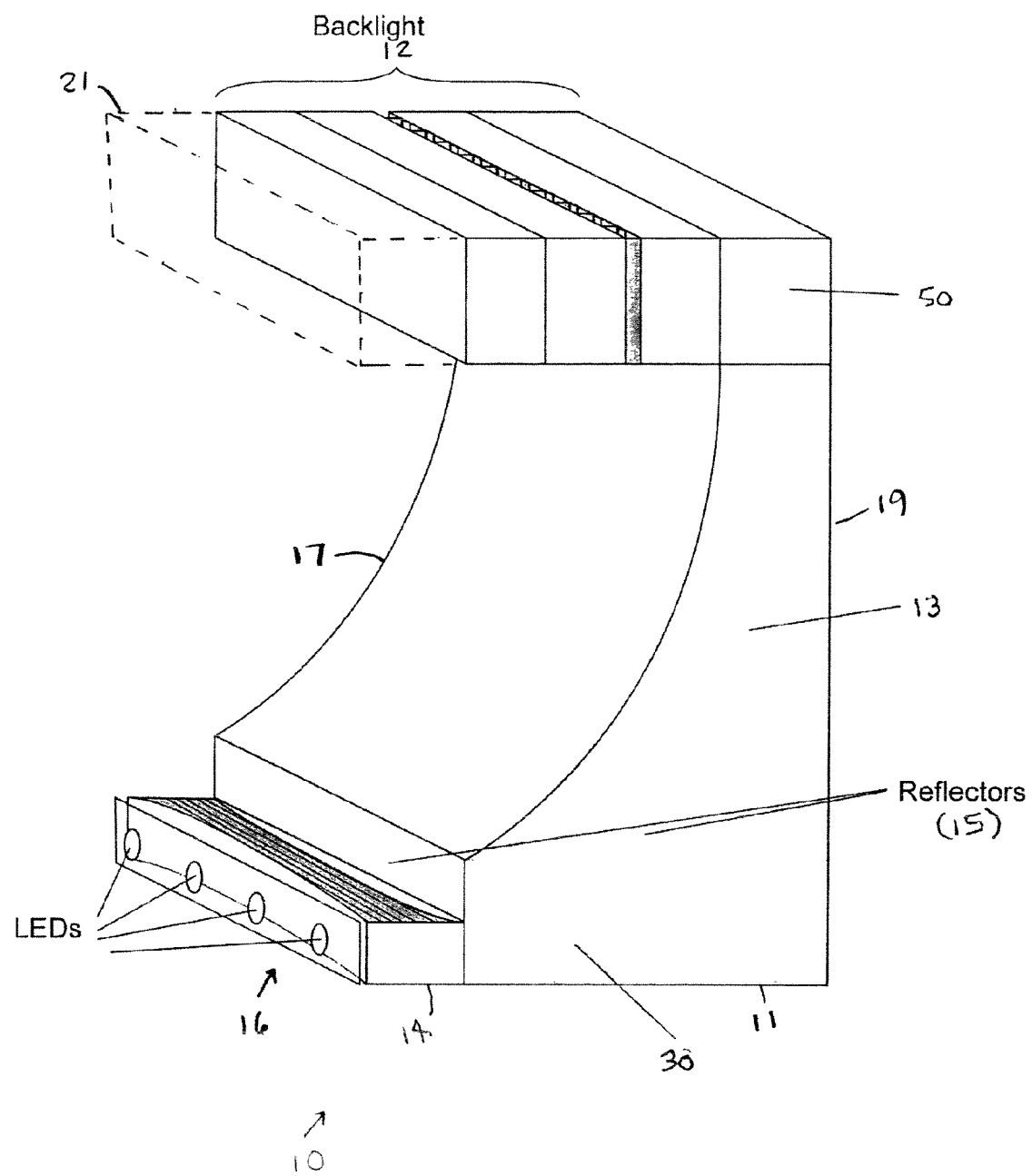
FIG. 1 depicts a backlighting assembly for a display panel under an illustrated embodiment of the invention.

Illustrated embodiments of the present invention are intended to include non-imaging optical couplers between small extended light sources, such as a light-emitting diode(s) (LED(s)) or LED array with output surfaces measured in hundreds of microns in one dimension, and hundreds of microns to several millimeters in the other and a thin, planar lightpipe, such as the one described below, to form a backlight subsystem FIG. 1 is a perspective view of a back lighting assembly 10 for a display device (e.g., a LCD display) shown generally in accordance with an illustrated embodiment of the invention. Included within the back lighting assembly 10 may be a light source 16, an optical coupler 14, a waveguide 13 and a light pipe assembly 12. The light source 16 may be a linear array of LED diodes. The light source 16 transmits a beam of light from each LED diode of the linear array along an axis 18.

The light source 16 may have a length of about 93.7 mm. Diodes may be spaced at any appropriate distance (e.g. every 4 mm) along the light source (i.e., along the y-axis) as shown in FIG. 1. The diodes may be provided with lenses with a radius of about 1.55 mm.

The light pipe assembly 12 may have any appropriate dimension on the sides and an overall thickness of about 250 microns. A light pipe 50 of the light pipe assembly 12 may have a thickness of about 90 microns. The light pipe 50 connects to a first end of the waveguide 13. The first end of the waveguide may also have a thickness of about 90 microns and a length of about 100 mm. The second end of the waveguide 13 may have a dimension of about 2-8 mm by 100 mm where the second end of the waveguide 13 connects to the coupler 14.

The prior art has taught that light sources should be connected directly to light pipe assemblies. However, it has been found that light propagating into waveguides from an array of diodes becomes more uniform with distance from the diode with a peripheral portion of a light output from the array dropping off with distance from the diode. The principle source of peripheral intensity drop is due to insufficient LED assembly length and is due to evanescing.

In order to optimize the performance of the backlight assembly 10, a number of tests were performed to identify if a coupler could improve the performance of the backlight assembly and if there was a relationship between a length of the coupler 14 and the uniformity of light emitted from the light pipe assembly 12. Through a series of tests using varying lengths of coupler measured along the x-axis, it has been found that for a light source 16 with the array of diodes 12 described above, an optimal length of the coupler 14 to compensate for insufficient LED assembly length is in the area of about 26 mm.

In addition to optimizing the length of the coupler 14, other modifications to the coupler may also be provided to offer significant further improvements in the backlighting capabilities of the backlighting assembly 10. For example, the coupler 14 of FIG. 2 has been found to decrease no-uniformity in light distribution from the backlighting assembly 10 to a level of only 5% with an optical coupling efficiency of 68%. In contrast, the coupler of FIG. 6 has been found to decrease no-uniformity in light distribution from the backlighting assembly 10 to a level of only 30% with an optical coupling efficiency of 72%.

Figure 2:
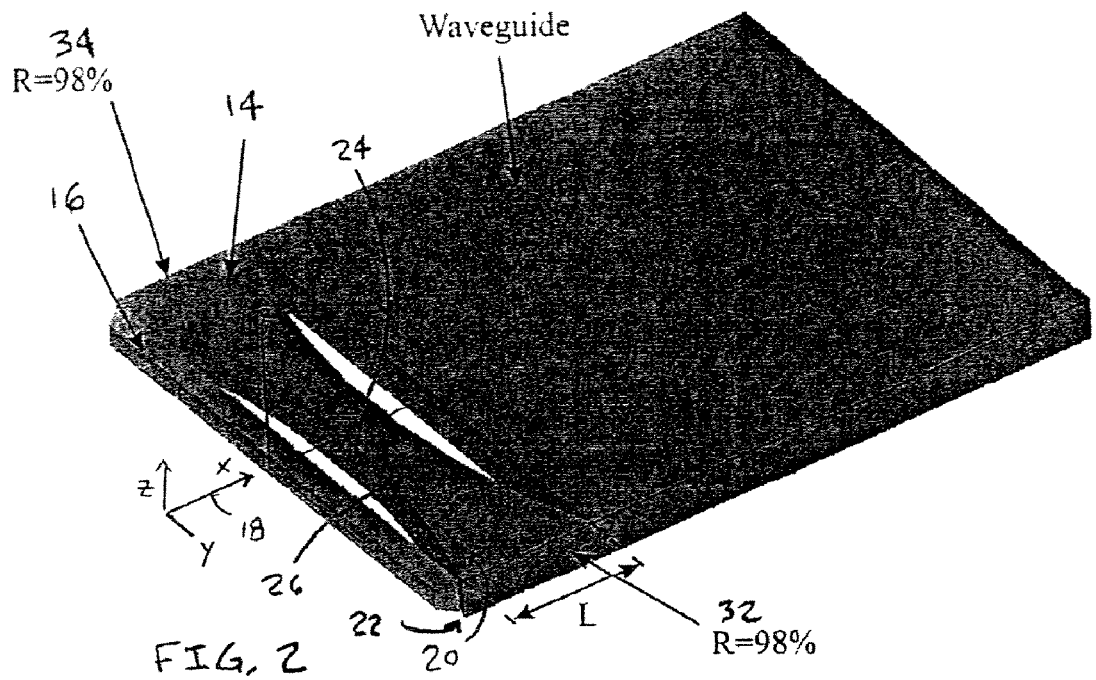
FIG. 2 shows a coupler and a portion of the waveguide of FIG. 1.
Figure 3:
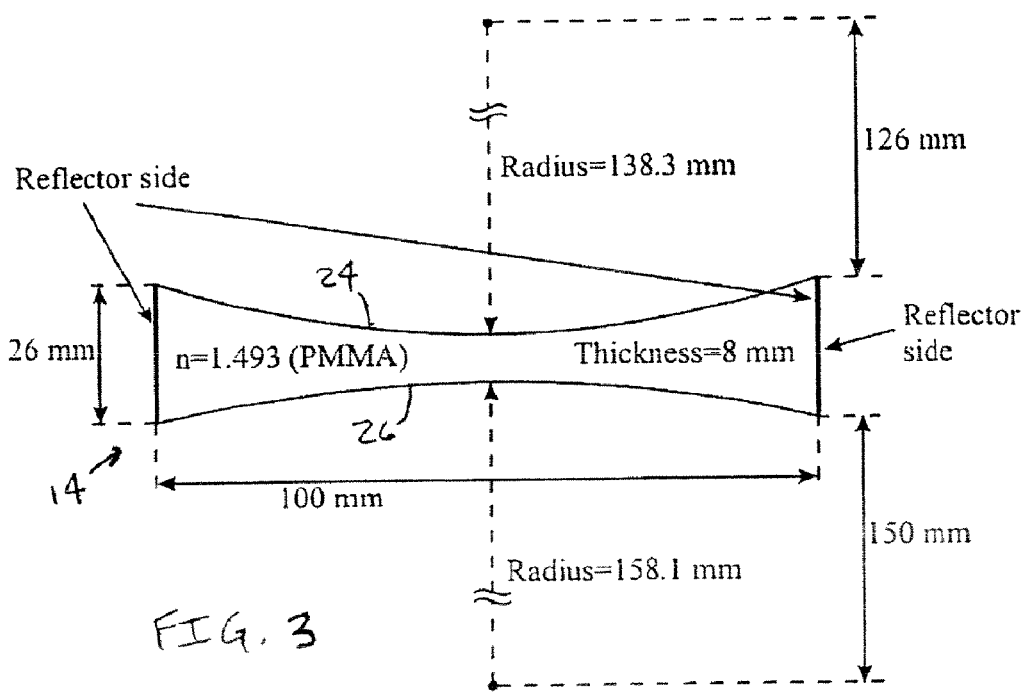
FIG. 3 depicts a lens that may be used by the backlighting assembly of FIG. 2.

Turning first to the coupler 14, FIG. 2 shows the coupler 14 along with a portion of the waveguide 13. Under the first illustrated embodiment, the optical coupler 14 is provided in the shape of a lens to couple and diffuse light from the light source 16 into the light pipe assembly 12. FIG. 3 is a top view of the optical coupler 14. It should be noted in this regard that a coupler provided in the shape of a lens is not a conventional use of a lens because there is no image involved and, instead, the lens is used for the purpose of diffusing light.

As can be seen from FIGS. 2 and 3, the optical coupler 14 has the form of a corrective concave lens when viewed along the x-axis 18, with planar upper and lower surfaces 20, 22. The optical coupler 14 may be fabricated of polymethyl methacrylate (PMMA) with an index of refraction n=1.493.

The optical coupler has a concave curvature on a side 24 of the coupler 14 facing the waveguide 13 with a radius of 138.3 mm and a concave curvature on the side 26 facing the light source 16 with a radius of 158.1 mm. The coupler 14 may have a thickness of 8 mm.

The concave curvature and differences of curvature on opposing sides of the coupler 14 provides one mechanism for diffusing unfocused light into the light pipe assembly 12. On a first level, the concave curvature provides an air gap between the coupler 14 and light source 16 and between the coupler 14 and waveguide 13 that progressively increases from the edges towards the center. The air gap provides a sharp change in the index of refraction in the case of light striking the coupler 14 from the light source 16, in the case of light exiting the coupler 14 and in the case of light entering the waveguide 13 from the coupler 14. The net result is a significant improvement in the distribution of light impinging on the waveguide 13 from the coupler 14.

Figure 4:
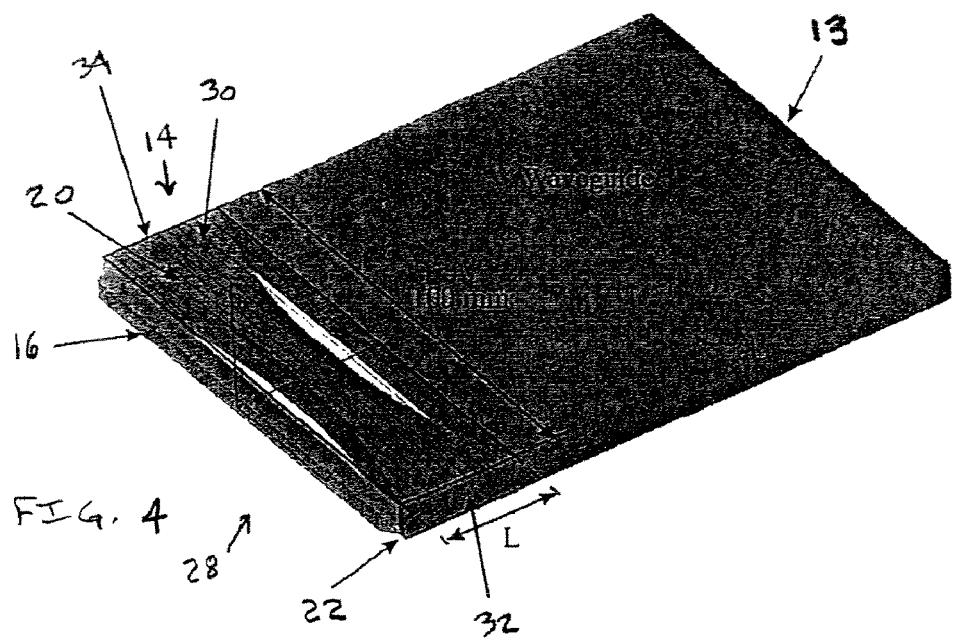
FIG. 4 depicts the coupler and a portion of the waveguide of FIG. 2 with additional detail.

FIG. 4 is a top view of the coupler 14 and a portion of the waveguide 13. Shown in FIG. 4 is a reflector system 28 disposed on the coupler 14 that improves the coupling efficiency and diffusion of light coupled by the coupler 14 from the light source 16 into the waveguide 13. The reflector system 28 may include a number of different reflector and diffusion mechanisms, used either singly or together. For example, FIG. 4 shows a microgroove pattern 30 disposed on an upper surface 20 and lower surface 22 of the coupler 14. The microgrooves of the microgroove pattern 30 may be mutually parallel and oriented in a direction perpendicular to the axis of transmission 18 of the light sources.

Figure 8:
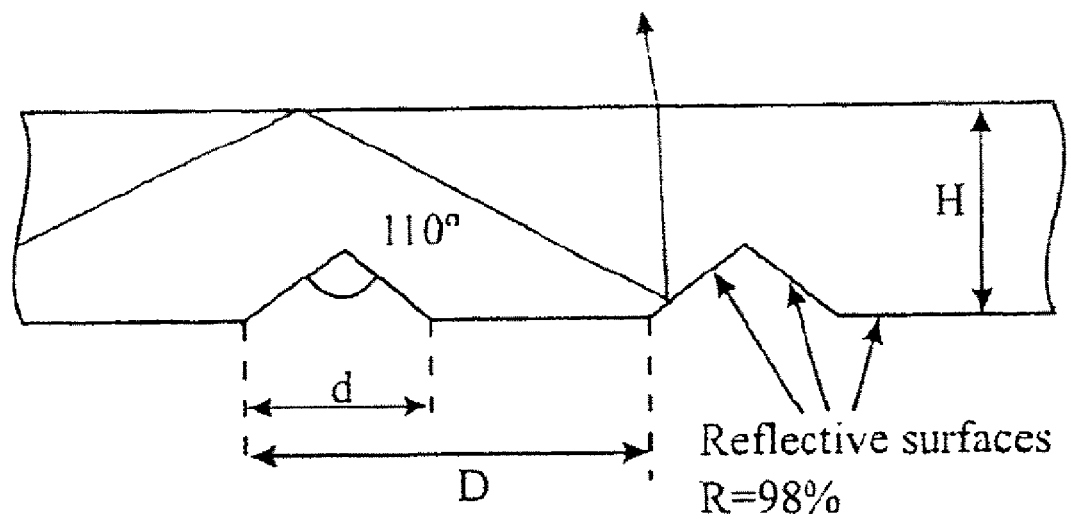
FIG. 8 depicts a microgroove pattern that may be used with the systems of FIGS. 1 and 4.

The microgroove pattern 30 may have the structure shown in FIG. 8. As shown, the microgrooves may have a v-shaped profile that subtends an angle of 110 degrees. Under one particular embodiment, the grooves may have a width, d, of about 200 microns and a relatively constant spacing, D, between the grooves of about 900 microns. Under another embodiment, the spacing D may begin at 900 microns nearest the light source 16 and become progressively shorter as the grooves approach the waveguide 13.

The microgrooves 30 and ends 32, 34 of the coupler 14 may also be coated with a layer of reflective material (e.g., aluminum). The layer may be a continuous coating that extends into the groove as well as over the spacing between grooves.

The combination of microgrooves and/or reflective material function to reflect and disperse light that enters the coupler 14 and then impinges on the top, bottom and sides of the coupler 14. The dispersion is compounded by the nature of the light source. In this case, the light source 16 may include a number of LEDs that each provide an arc of light energy (e.g., at 60° HWFM)) into the coupler 14.

Figure 5:
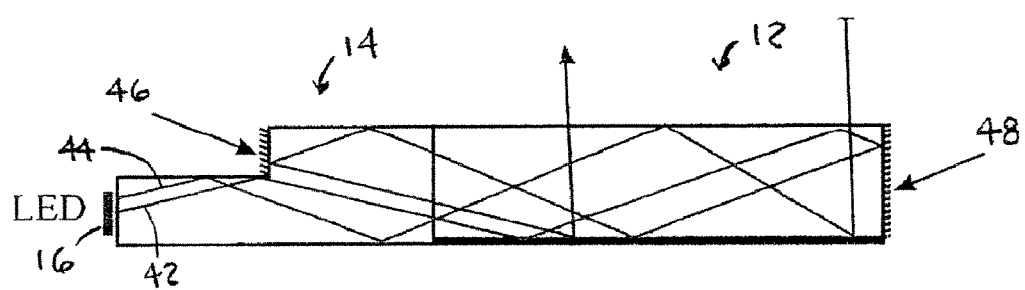
FIG. 5 depicts the coupler and a portion of the waveguide of FIG. 1 under an alternate illustrated embodiment.

FIGS. 5 and 6 illustrate another embodiment. As before, FIGS. 5 and 6 show the coupler 14 along with a portion of the waveguide 13. FIGS. 7a-b show side and top views of the coupler 14.

Under the embodiment illustrated in FIG. 6, the coupler 14 is provided with an L-shaped or stepped profile proceeding across the coupler 14 from the light source 16 towards the waveguide 13. The coupler 14 of FIGS. 6 and 7 has a first portion 34 of a first thickness and a step 35 that divides the first portion 34 from a second, stepped portion 36 that has a significantly greater thickness than the thickness of the first portion 34. As shown in FIG. 7a, the first portion 34 may have a thickness of 5.18 mm and the second portion 36 may have a thickness of 8 mm.

The coupler 14 of FIG. 6 may also have a tapered ends 38, 40 that converge from the step 35 on opposing edges towards the marginal edge of the coupler 14 adjacent the light source 16. As shown in FIG. 7b, the ends may converge by a distance of 2.43 mm over a distance of 16.4 mm.

As shown in FIG. 5, the step 35 may also include a layer of a reflective coating 46 disposed over the step 35. A second reflector 48 may be disposed over a distal end of the light pipe assembly 12. The coupler 14 of FIGS. 4-6 may or may not include an air gap 46 separating the coupler 14 from the waveguide 13.

The coupler 14 of FIGS. 5-7 diffuses light into the light pipe assembly 12 from the light source 16 using a number of different mechanisms. Under a first mechanism, the first portion 34 provides a relatively narrow channel in the z direction and a diverging channel in the y direction. Since the first and second portions 34, 36 are substantially surrounded by air, the change of the index of refraction reflects light back into the light channels defined by the first and second portions 34, 36. Within the first portion 34, the narrow channel in the z direction confines the light in the z direction while the diverging channel formed by sides 38, 40 allows the light to diverge outwards. This allows the overall shape and distribution of the light from the light source 16 to diverge and diffuse into the overall width and height provided by the light pipe assembly 12 before entering the light pipe assembly 12. The increased thickness of the second portion 36 allows the diffusion process to continue in the z-direction.

Light within the coupler 14 and waveguide 13 may proceed along the paths 42, 44 depicted in FIG. 5. In this case, the light may proceed directly from the light source 16 through the coupler 14 and into the waveguide 13 without encountering the side walls of the coupler 14 or may encounter and be reflected from the side walls, such as is shown in the case of rays or photons 42, 44. In this case, the rays of light 42, 44 may propagate through the waveguide 13 and be reflected from a waveguide reflector 48 on a distal end of the waveguide 13.

Upon being reflected by the reflector 48, the light may engage the walls of the waveguide or be reflected back into the coupler 14. As shown in FIG. 1, a bottom surface of the waveguide 13 may also include a pattern of microgrooves 30 and/or a layer of reflective material that function to reflect any incident light upwards.

If reflected back into the coupler 14, the light may encounter the step reflector 46. If the step reflector includes the pattern of microgrooves 30, the light may be further diffused by again being reflected back into the waveguide 13.

In another embodiment, the first and second portions 34, 36 are of the same height and there is no step reflector 46. In this case, the tapered sides 38, 40 allow the light to diffuse outwards and upwards within the coupler 14 before entering the waveguide 13. In order to direct the light, the waveguide 13 may also include a set of reflectors 15 on opposing sides. The reflectors may include a pattern of microgrooves 30 and/or a layer of reflective material.

As shown by the paths 42, 44 in FIG. 5, light from the light source 16 enters the waveguide 13 at relatively low angles. The microgrooves 30 on the floor 19 and reflectors 15 are provided to engages the incident light and redirect the incident light in an upwards direction along the z-axis. If the incident light is near the coupler 14, then the light may engage the curved surface 17 and back wall 19 one or more times before arriving at and entering the light pipe 50.

Figure 10:
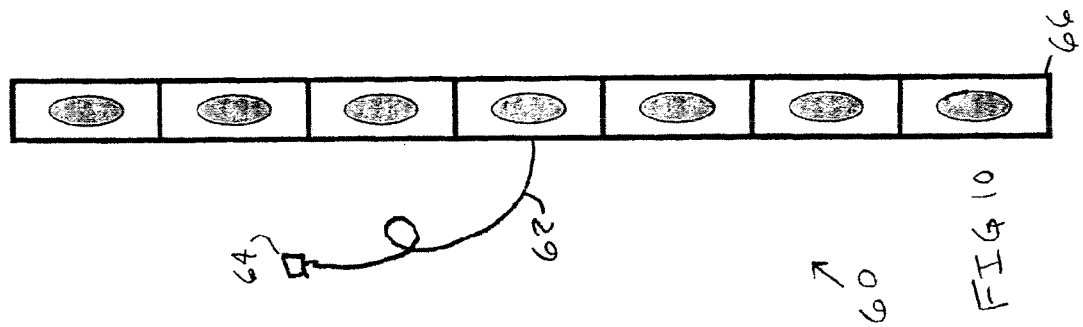
FIG. 10 shows an optical distribution system that may be used with the backlighting assembly of FIG. 1.

In another illustrated embodiment, the back light assembly 10 shown in FIG. 1 may be miniaturized and optical efficiency improved even further through use of the optical converter 60 shown in FIG. 10 in place of the optical source 16. In the optical converter 60, the LEDs of the optical source 16 are replaced with a single light source 64 of possible a light source of a larger size and of greater efficiency. Optical energy from the single light source 64 is captured and delivered to an optical array or distributor 66 through use of an optical cable 62.

In general, the vast majority of optical fibers have a circular cross-section, which results in "dead space" when they are packed in bundles, as the fill-factor is significantly less than 100%. However, state-of-the-art manufacturing processes used in the fabrication of plastic optical fibers (POFs) could allow for a change in the shape of the outer cladding of the fiber, resulting in a cross-section that is hexagonal (FIG. 12), rectangular (FIG. 12), or square—amongst others. Fibers with these non-circular cross-sections can be packed in bundles with a fill-factor of virtually 100%. This cross-section is maintained throughout the length of the fiber, due primarily to the fact that the fibers are "drawn" in long spools with a consistent form-factor.

Non-imaging optical tapers are light pipes that resemble optical fibers, with the exception that they have an expanded cross-section on one end, relative to the opposite end. However, except for the change in diameter, the cross-sections at the opposite ends of the optical taper are roughly equivalent (i.e., both are circular). They are also much shorter than optical fibers in their length.

Figure 11:
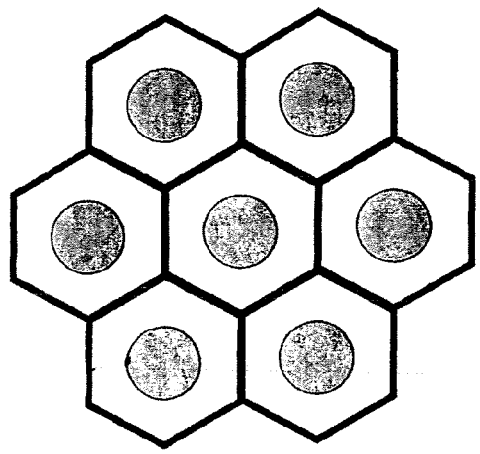
FIG. 11 shows the close-packed ends of the distribution system of FIG. 10.
Figure 12:
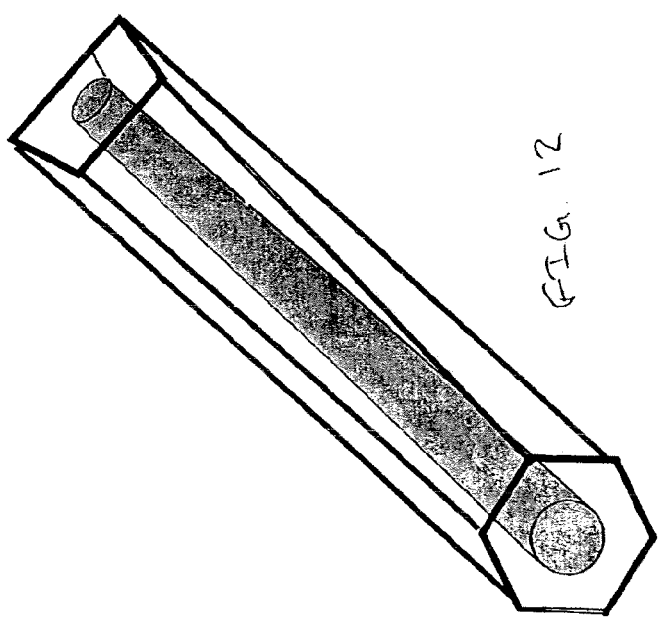
FIG. 12 shows an example of the optical taper shown in FIG. 10.

The optical converter 60 comprises what could summarily be described as a merging of plastic optical fiber technology with optical taper technology, so as to form a short optical fiber with two different cross section geometries, (e.g., hexagonal on one end, and rectangular on the other, as shown in FIG. 12), the purpose of which is to form a novel anamorphosor. By having a smooth transition between the two cross section geometries, total internal reflection can be maintained. These individual anamorphosors can then be combined into an array 66 (FIG. 11) on one end and the close-packed structure shown in FIG. 11 on the other end, thereby, allowing a small extended light source, such as a light-emitting diode (LED), to illuminate a target optic, such as a planar light pipe, having a vastly different input cross-section with respect to the output cross-section of said source The present invention is intended to be used as a non-imaging optical coupler between a small extended light source, such as a light-emitting diode (LED) or LED array with output surfaces measured in hundreds of microns in one dimension, and hundreds of microns to several millimeters in the other and a thin, planar light pipe, such as the one described herein, to form a backlight subsystem 66 for a display system.

Figure 9:
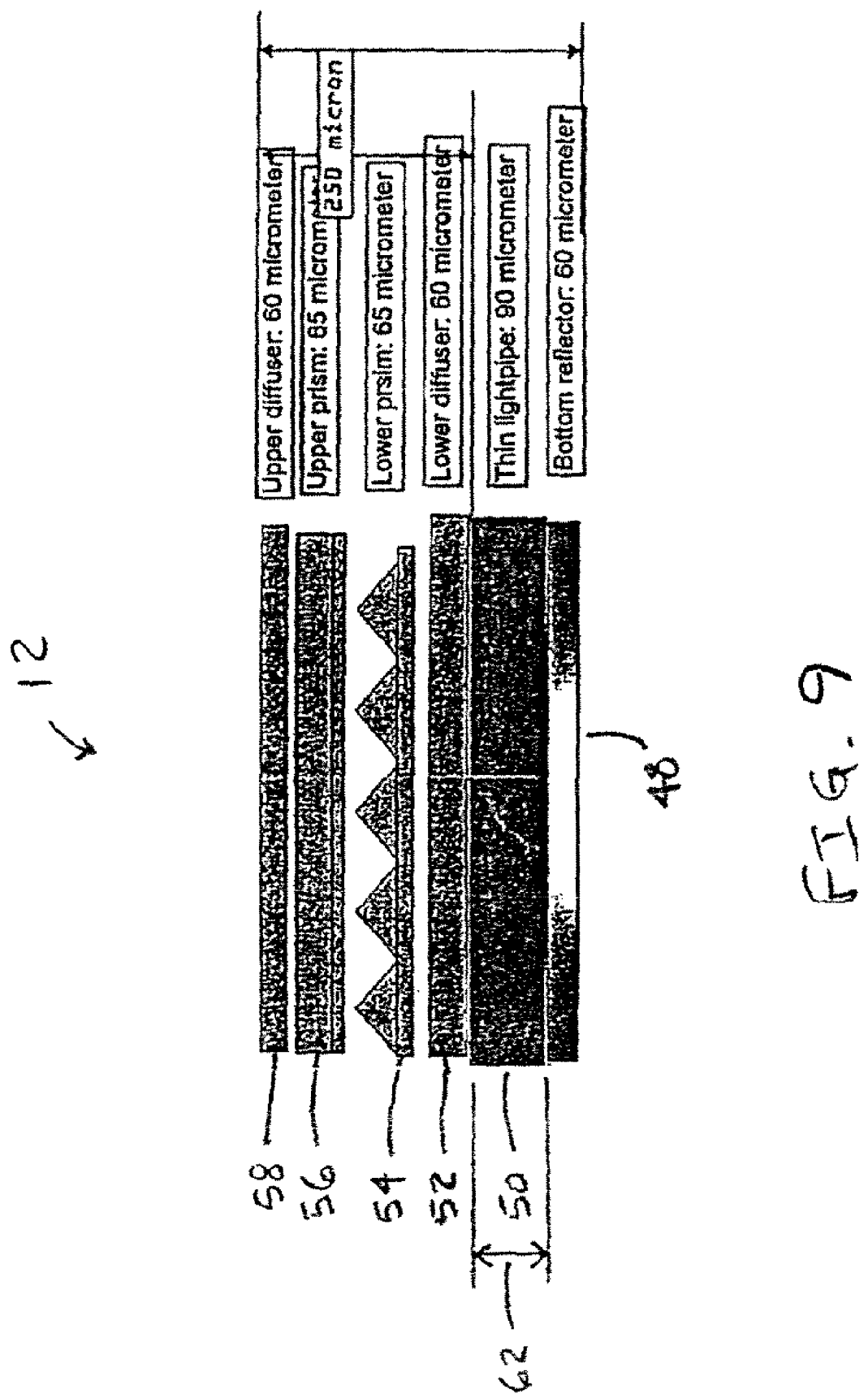
FIG. 9 depicts a light pipe assembly that may be used with the systems of FIGS. 1 and 4.

Turning now to the light pipe assembly 12, the assembly 12 (FIG. 9) may include a bottom reflector 48, the light pipe 50, a lower diffuser 52, a lower prism 54, an upper prism 56 and an upper diffuser 58. The light pipe 50 may have a length and width commiserate with the size of the LCD panel 21 with which it is used. The thickness of the tapered light pipe 50 may have a thickness of 90 microns on the proximal end that mates with the coupler 14 and a lesser thickness on a distal end.

The bottom reflector 48 of the tapered light pipe 50 may include a pattern of microgrooves 30 arranged parallel to the axis y. As above, the microgrooves may a v-shaped profile that subtends an angle of 110 degrees as shown in FIG. 8. Under one particular embodiment, the grooves may have a width, d, of about 200 microns and a relatively constant spacing, D, between adjacent grooves of about 900 microns. Under another embodiment, the spacing D may begin at 900 microns nearest the coupler 14 and decrease in spacing as the microgrooves approach the distal end. A layer of reflective material (e.g., aluminum) may be disposed on the back surface of the light pipe 50 over the pattern of microgrooves 30.

The lower diffuser 52 may be an elliptical surface diffuser microstructure formed in the front surface of the light pipe 50. The lower diffuser 52 may be created using methods described in U.S. Pat. No. 6,481,864, incorporated herein by reference. The lower diffuser 52 functions to reduce the Lambertian spreading of light exiting the light pipe 50 caused by the bottom reflector 48.

The microstructure of the lower diffuser 52 also creates a small air gap between the lower diffuser 52 and lower prism 54. The air gap introduces a change in the index of refraction between the lower diffuser and lower prism 54. Light incident upon the air gap at sharp angles relative to the x-axis from the light pipe 50 is reflected back into the light pipe 50.

Light emanating from the light pipe 50 through the lower diffuser 52 is modified by the lower diffuser 52 to have an elliptically shape so that a long portion of the ellipse or oriented in the y-direction and the short portion is oriented in the z-direction. The result is that light emanating through the lower diffuser is spread substantially across the light pipe assembly 12 in the transverse direction (i.e., in the y-direction) resulting in the light being a more evenly distributed across the light pipe assembly 12.

Located above the lower diffuser 52 are upper and lower prism layers 54, 56. In this case the lower prism structure 54 may include a saw-tooth array of prisms extending in the y-direction while the upper prism structure 56 may include a saw-tooth array of prisms extending in the z-direction.

The spacing and slope of each prism of the prism layers 54, 56 are designed to accept light exiting the light pipe 50 at some angle (e.g., 42°) and to redirect the light closer to the normal (i.e., in the x-direction). The lower and upper prisms 54, 56 function together to correct the direction of light emanating from the light pipe 50 in any direction.

Located at the top of the light pipe assembly 12 is an upper diffuser 58. The upper diffuser 58 functions to slightly even out the light output from the upper and lower prisms 54, 56.

The upper diffuser 58 may provide a circular light output for any given point having a very small conical shape in the range of from 0.5° to about 5°. In effect, the upper diffuser 58 functions to more evenly distribute light and yet keep the light relatively collimated and near the normal (z-direction).

A specific embodiment of apparatus for back lighting a display has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A backlight assembly comprising:
    a light pipe assembly;
    a light source; and
    a coupler that receives light from the light source and diffuses the received light from the light source into the first end of the light pipe assembly,
        wherein the coupler has a concave curvature on a side facing the light source to provide an air gap between the coupler and the light source.

2. The backlight assembly as in claim 1 wherein the concave curvature of the coupler implements a corrective lens.

3. A backlight assembly comprising:
    a light pipe assembly;
    a light source; and
    a coupler with a lens disposed between the light source and the light pipe assembly that diffuses light from the light source into the light pipe assembly,
        wherein the coupler has a concave curvature on the side facing the light source to provide an air gap between the coupler and the light source.

4. A backlight assembly comprising:
    a light pipe assembly;
    a light source; and
    a coupler with a light receiving portion dimensioned for an angular emission characteristic of the light source,
        wherein the light receiving portion has a concave curvature to provide an air gap between the coupler and the light source.

* * * * *